(12) United States Patent
Gantenbein et al.

(10) Patent No.: US 9,988,764 B2
(45) Date of Patent: Jun. 5, 2018

(54) PROCESS FOR PREPARING SELF-BINDING PIGMENT PARTICLE SUSPENSIONS

(71) Applicant: Omya International AG, Oftringen (CH)

(72) Inventors: Daniel Gantenbein, Basel (CH); Joachim Schoelkopf, Oberkulm (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days. days.

(21) Appl. No.: 15/584,429

(22) Filed: May 2, 2017

(65) Prior Publication Data

US 2017/0233948 A1    Aug. 17, 2017

Related U.S. Application Data

(63) Continuation of application No. 14/238,508, filed as application No. PCT/EP2012/066302 on Aug. 22, 2012, now Pat. No. 9,670,366.

(60) Provisional application No. 61/531,662, filed on Sep. 7, 2011.

(30) Foreign Application Priority Data

Aug. 31, 2011 (EP) .................................... 11179604

(51) Int. Cl.

| | | |
|---|---|---|
| *D21H 17/67* | (2006.01) | |
| *D21H 17/69* | (2006.01) | |
| *D21H 17/24* | (2006.01) | |
| *D21H 17/32* | (2006.01) | |
| *D21H 17/28* | (2006.01) | |
| *C09C 1/02* | (2006.01) | |
| *C09C 1/36* | (2006.01) | |
| *C09C 1/42* | (2006.01) | |
| *C08K 13/02* | (2006.01) | |
| *C08K 13/06* | (2006.01) | |
| *D21H 17/00* | (2006.01) | |
| *D21H 19/38* | (2006.01) | |
| *D21H 19/42* | (2006.01) | |
| *B82Y 30/00* | (2011.01) | |
| *D21H 21/28* | (2006.01) | |
| *C04B 14/28* | (2006.01) | |
| *C04B 26/28* | (2006.01) | |
| *C09C 1/00* | (2006.01) | |
| *C09D 105/00* | (2006.01) | |
| *C08K 3/26* | (2006.01) | |

(52) U.S. Cl.
CPC .............. *D21H 17/74* (2013.01); *B82Y 30/00* (2013.01); *C04B 14/28* (2013.01); *C04B 26/28* (2013.01); *C09C 1/009* (2013.01); *C09C 1/0009* (2013.01); *C09C 1/0081* (2013.01); *C09C 1/0084* (2013.01); *C09C 1/0093* (2013.01); *C09C 1/021* (2013.01); *C09D 105/00* (2013.01); *D21H 17/00* (2013.01); *D21H 17/32* (2013.01); *D21H 17/675* (2013.01); *D21H 17/69* (2013.01); *D21H 19/385* (2013.01); *D21H 19/42* (2013.01); *D21H 21/28* (2013.01); *C01P 2004/62* (2013.01); *C01P 2004/64* (2013.01); *C01P 2006/12* (2013.01); *C01P 2006/22* (2013.01); *C01P 2006/60* (2013.01); *C08K 2003/265* (2013.01)

(58) Field of Classification Search
CPC .............. C01P 2004/62; C01P 2006/22; C01P 2006/60; C01P 2006/12; C09C 1/021; C09C 1/42; C09C 1/36; C09C 1/3676; C09C 1/405; C09C 3/041; D21H 17/00; D21H 17/69; D21H 17/67; D21H 17/24; D21H 9/38; D21H 17/32; D21H 17/28; D21H 19/38; A01N 59/06; Y10T 428/25; C08K 3/26; C08K 3/346; C08K 13/02; C08K 13/06; C08K 2003/265; B82Y 30/00; B82Y 40/00; C04B 14/28; C04B 26/28

See application file for complete search history.

(56) References Cited

U.S. PATENT DOCUMENTS

| | | | |
|---|---|---|---|
| 2,949,397 | A | 8/1960 | Werner et al. |
| 5,384,013 | A | 1/1995 | Husband et al. |
| 5,708,162 | A | 1/1998 | Hilbig et al. |
| 5,731,034 | A | 3/1998 | Husband |
| 5,744,001 | A | 4/1998 | Linhart et al. |
| 7,858,154 | B2 | 12/2010 | Schmidt-Thuemmes et al. |
| 8,343,312 | B2 | 1/2013 | Mahr et al. |
| 8,877,847 | B2 | 11/2014 | Federici |
| 9,045,861 | B2 | 6/2015 | Saastamoinen |
| 9,365,723 | B2 | 6/2016 | Gane |
| 9,611,587 | B2 | 4/2017 | Gantenbein |

(Continued)

FOREIGN PATENT DOCUMENTS

| | | |
|---|---|---|
| CN | 1052912 A | 7/1991 |
| EP | 2011766 A1 | 1/2009 |

(Continued)

OTHER PUBLICATIONS

The Search Report dated Nov. 18, 2016 for EP 16192274.5.

(Continued)

*Primary Examiner* — Jose A Fortuna

(74) *Attorney, Agent, or Firm* — Amster, Rothstein & Ebenstein LLP

(57) ABSTRACT

The invention relates to a process for preparing self-binding pigment particle suspensions, to a self-binding pigment particle suspension as well as to a paper product comprising self-binding pigment particles and to the use of the self-binding pigment particle suspension as filler material.

27 Claims, 3 Drawing Sheets

(56) References Cited

U.S. PATENT DOCUMENTS

| | | | |
|---|---|---|---|
| 9,670,366 B2 * | 6/2017 | Gantenbein | C09C 1/021 |
| 2007/0266898 A1 | 11/2007 | Gane | |
| 2007/0298261 A1 | 12/2007 | Schmidt-Thuemmes et al. | |
| 2008/0210394 A1 | 9/2008 | Mahr | |
| 2010/0120948 A1 | 5/2010 | Gane et al. | |
| 2010/0197905 A1 | 8/2010 | Rodrigues et al. | |
| 2011/0259537 A1 | 10/2011 | Husband et al. | |
| 2012/0165436 A1 | 6/2012 | Tanake | |
| 2012/0283374 A1 | 11/2012 | Jonson et al. | |
| 2013/0192778 A1 | 8/2013 | Jabar et al. | |
| 2013/0251921 A1 | 9/2013 | Gane et al. | |
| 2014/0165877 A1 | 6/2014 | Gane et al. | |
| 2014/0165879 A1 | 6/2014 | Gane et al. | |
| 2014/0234639 A1 | 8/2014 | Malla et al. | |
| 2015/0044127 A1 | 2/2015 | Gantenbein | |
| 2015/0083026 A1 | 3/2015 | Gantenbein et al. | |
| 2015/0090415 A1 | 4/2015 | Gantenbein | |
| 2015/0096698 A1 | 4/2015 | Gantenbein | |
| 2015/0105260 A1 * | 4/2015 | Gantenbein | C09C 1/021 504/367 |
| 2015/0128830 A1 | 5/2015 | Gane | |
| 2015/0175775 A1 | 6/2015 | Saastamoinen | |
| 2015/0225899 A1 | 8/2015 | Saastamoinen | |
| 2017/0233948 A1 * | 8/2017 | Gantenbein | C09C 1/021 106/205.9 |

FOREIGN PATENT DOCUMENTS

| | | |
|---|---|---|
| EP | 2208761 A1 | 7/2010 |
| EP | 2565237 A1 | 3/2013 |
| EP | 2379649 B1 | 11/2013 |
| EP | 2505614 B1 | 11/2013 |
| EP | 2565236 B1 | 1/2014 |
| EP | 2505615 B1 | 5/2014 |
| EP | 2505615 B9 | 10/2014 |
| JP | 069302 A | 1/1994 |
| JP | 2003119692 A | 4/2003 |
| WO | 9108341 A1 | 6/1991 |
| WO | 9516003 A1 | 6/1995 |
| WO | 9743060 A1 | 11/1997 |
| WO | 2006008657 A2 | 1/2006 |
| WO | 2006128814 A1 | 12/2006 |
| WO | 2008139292 A1 | 11/2008 |
| WO | 2012130702 A1 | 10/2012 |
| WO | 2012130706 A1 | 10/2012 |
| WO | 2013030051 A1 | 3/2013 |
| WO | 2013030178 A1 | 3/2013 |

OTHER PUBLICATIONS

The Office Action dated Feb. 17, 2015 for CA 2,844,541.
The Office Action dated Feb. 26, 2014 for CL 464-14.
The Office Action dated Feb. 3, 2015 for JP 2014-527587.
The Office Action dated Jun. 17, 2015 for KR 10-2014-7006778.
The Office Action dated Jul. 21, 2015 for CO 14-32142-3.
The Office Action dated May 23, 2014 for TW 101129684.
The International Search Report dated Sep. 19, 2012 for PCT/EP2012/066302.
The Written Opinion of the International Searching Authority dated Sep. 19, 2012 for PCT/EP2012/066302.
The European Search Report dated Feb. 6, 2012 for EP 11179604.1.
The Office Action dated Oct. 30, 2014 for CN 201280042151.2.

* cited by examiner

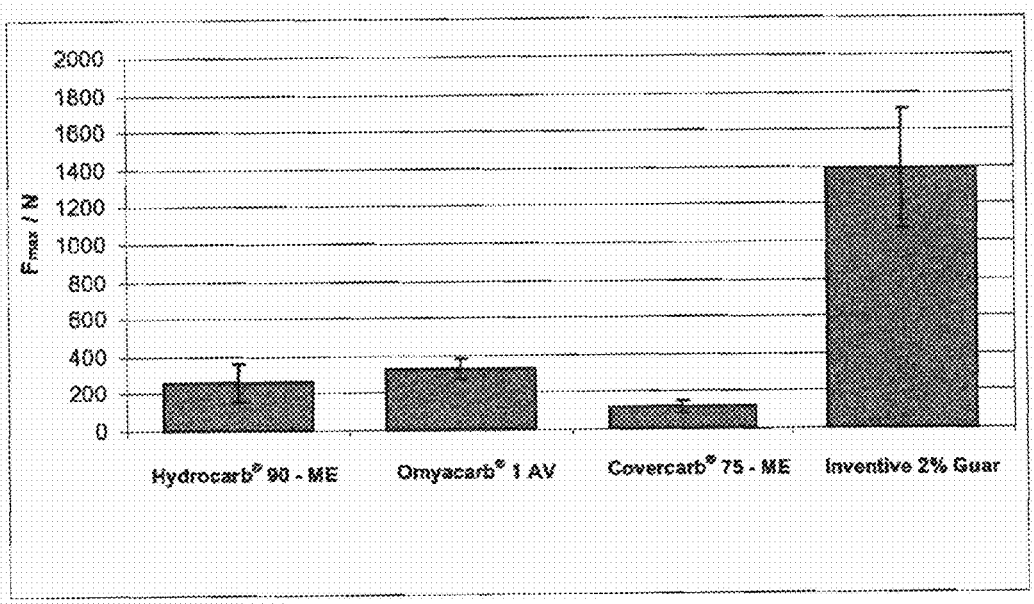

PROCESS FOR PREPARING SELF-BINDING PIGMENT PARTICLE SUSPENSIONS

CROSS-REFERENCE TO RELATED APPLICATIONS

This application is a continuation of U.S. application Ser. No. 14/238,508, filed Apr. 21, 2014, now U.S. Pat. No. 9,670,366, which is the U.S. national phase of PCT Application No. PCT/EP2012/066302, filed Aug. 22, 2012, which claims priority to European Application No. 11179604.1, filed Aug. 31, 2011 and U.S. Provisional Application No. 61/531,662, filed Sep. 7, 2011, the content of which is hereby incorporated by reference.

BACKGROUND OF THE INVENTION

The invention relates to a process for preparing self-binding pigment particle suspensions, to a self-binding pigment particle suspension as well as to a paper product comprising self-binding pigment particles and to the use of the self-binding pigment particle suspension as filler material.

Mineral materials and binders are among the main constituents used in the manufacture of numerous products such as paints, paper and plastic materials. Therein, mineral materials such as calcium carbonate and other particulate materials contribute mechanical and optical properties, while the binder, generally latex-based and in the form of aqueous suspensions or dispersions, provide the necessary adhesion and cohesion for the respective constituents of the end product to be produced.

In order to avoid the logistic difficulties of handling mineral materials and binders separately, and further to avoid the unwanted physical and chemical interactions developed in comparable mixtures of mineral materials and binders, self-binding pigment particles have been developed and are known to industry. In this regard, self-binding pigment particles contributing both the properties of the mineral material and of the binder may be directly implemented in a variety of applications.

This unique product named self-binding pigment particles refers to distinct, solid particles, formed of mineral material and binder that are intimately bound to one another. The internal cohesion forces are such as to provide the self-binding pigment particles with excellent mechanical stability.

Self-binding pigment particles are prepared by a process implementing at least one step of grinding mineral materials in the presence of binder, where grinding refers to an operation leading to a reduction in the particle size; the mineral materials in the self-binding pigment particles have a smaller diameter than the initial mineral material used to produce them. Such self-binding pigment particles are described in a number of documents, including WO 2006/008657, WO 2006/128814, and WO 2008/139292.

However, there is still a need in the art for a process for preparing self-binding pigment particle suspensions which would solve one or more of the following multifaceted technical problems:

to prepare a suspension of self-binding pigment particles resulting in a paper coating having a content of binder that is below the content of latex binder typically used in the preparation of such paper coatings;

to prepare a suspension of self-binding pigment particles allowing for the provision of a filler material for paper products such that the paper product has a sufficient tensile index, preferably a tensile index of at least 10 Nm/g;

to prepare a suspension of self-binding pigment particles such that the content of components based on fossil resources in the obtained suspension is reduced, that is to say the self-binding pigment particle suspension comprises a binder that is obtained from renewable resources;

to prepare a suspension of self-binding pigment particles such that the obtained suspension provides a higher biodegradability than a corresponding suspension prepared with latex-based binder typically used in the preparation of such a suspension;

to prepare a suspension of self-binding pigment particles having a sufficient microbiological stability such that a fouling of the obtained suspension and end products prepared from such a suspension is delayed;

to prepare a suspension of self-binding pigment particles containing less sticky materials such that less deposits are observed on the equipment used during preparation, storage and application of the suspension, that is to say a suspension that provides a better handling.

There is a continuous need for improving processes for the preparation of self-binding pigment particle suspensions which addresses the foregoing technical problems described and especially allows for reducing the content of polymeric latex-based binder in such suspensions.

SUMMARY OF THE INVENTION

Accordingly, it is an objective of the present invention to provide a process for preparing self-binding pigment particle suspensions having a reduced content of latex-based binder. A further objective is to provide a process for preparing self-binding pigment particle suspensions such that a paper product prepared from such a suspension features a tensile index of at least 10 Nm/g. Even a further objective is to provide a process for preparing self-binding pigment particle suspensions having a reduced content of components based on fossil resources. A still further objective is to provide a process for preparing self-binding pigment particle suspensions having an increased biodegradability compared to a suspension prepared with a latex binder. Another objective of the present invention is to provide a process for preparing self-binding pigment particle suspensions providing a sufficient microbiological stability. A further objective is to provide a process for preparing self-binding pigment particle suspensions that can be carried out under cost-efficient conditions, i.e. by avoiding cost-intensive raw materials and/or intensive cleaning steps. Further objectives can be gathered from the following description of the invention.

While the Applicant knows as a solution the unpublished European Patent Application Number 11 160900.4 describing a process for preparing of self-binding pigment particles comprising the steps of: a) providing an aqueous mineral pigment suspension, b) providing at least one polymeric binder, wherein the binder comprises at least one carboxymethylcellulose having a degree of carboxylation in the range of 0.4 to 2.0 and having an intrinsic viscosity in the range of 3 to 300 ml/g, c) mixing the binder of step b) with the aqueous mineral pigment material suspension of step a) and adjusting the solids content of the obtained suspension so that it is from 45 to 80 wt.-%, based on the total weight of the suspension, and d) grinding the aqueous mineral material suspension of step c), and the unpublished European Patent Application Number 11 160926.9 describing a process for preparing of self-binding pigment particles comprising the steps of: a) providing an aqueous mineral pigment suspension, b) providing at least one polymeric binder, wherein the binder comprises at least one modified polysaccharide having a degree of carboxylation in the range of 0.4 to 2.0 and having an intrinsic viscosity in the range of 3 to 300 ml/g, wherein the carbon of the binder shows a rate of nuclear transformation of $^{14}C$ to $^{12}C$ of between 900 and 920 transformations per hour and per gram carbon in the binder; c) mixing the binder of step b) with the aqueous mineral pigment material suspension of step a) and adjusting the solids content of the obtained suspension so that it is from 45 to 80 wt.-%, based on the total weight of the suspension, and d) grinding the aqueous mineral material suspension of step c) until the fraction of self-binding pigment particles having a particle size of less than 1 μm is greater than 5 wt.-%, based on the total weight of the pigment particles, the foregoing and other objects are solved by the subject-matter as defined herein in the present invention.

According to a first aspect of the present invention, a process for preparing self-binding pigment particle suspensions is provided, wherein the process comprises the steps of:
a) providing an aqueous pigment material suspension,
b) providing at least one polymeric binder, wherein the binder comprises at least one polysaccharide comprising galactose and/or mannose units,
c) mixing the polymeric binder of step b) with the aqueous pigment material suspension of step a); and
d) grinding the aqueous pigment material suspension of step c).

The inventors surprisingly found that the foregoing process according to the present invention leads to self-binding pigment particle suspensions providing a reduced content of binder as well as of sticky materials and of components based on fossil resources, a sufficient biodegradability and microbial stability and imparts a tensile index of at least 10 Nm/g to paper products prepared from such a suspension. More precisely, the inventors found that the properties of a suspension of self-binding pigment particles can be improved by the addition of a defined polysaccharide comprising galactose and/or mannose units as the binder.

BRIEF DESCRIPTION OF THE FIGURES

FIG. 3: illustrates the maximum force, $F_{max}$, required to make the first crack into a tablet.

DETAILED DESCRIPTION OF THE INVENTION

Figure 1:
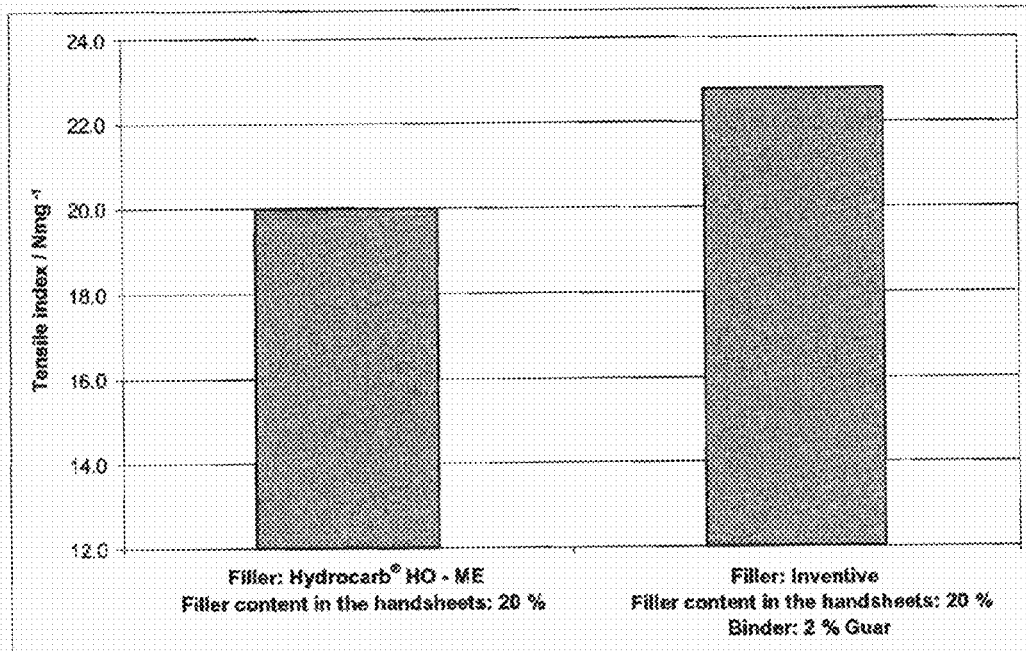
FIG. 1: illustrates the effect of the self-binding pigment particle suspensions on the tensile index for handsheets prepared from such suspensions.

It should be understood that for the purposes of the present invention, the following terms have the following meaning:

The term aqueous "pigment material" suspension in the meaning of the present invention encompasses natural and/or synthetic materials, like calcium carbonate, talc, chalk, dolomite, mica, titanium dioxide, etc.

The term aqueous pigment material "suspension" in the meaning of the present invention comprises insoluble solids and water and optionally further additives and usually contains large amounts of solids and, thus, is more viscous and generally of higher density than the liquid from which it is formed.

The term "binder" as used in the present invention is a compound that is conventionally used to bind together two or more other materials in mixtures. However, in the process of the present invention the binder has an effect other than aggregation, namely the effect of improving the tensile index of products prepared from self-binding pigment particle suspensions.

The term "polysaccharide comprising galactose and/or mannose units" in the meaning of the present invention refers to polymeric carbohydrate structures, formed by a plurality of galactose and/or mannose units joined together by glycosidic bonds. These structures are often linear, but may contain various degrees of branching.

Another aspect of the present invention is directed to a self-binding pigment particle suspension obtainable by the process.

A further aspect of the present invention is directed to a paper product comprising self-binding pigment particles, wherein the pigment particles are at least partially coated with at least one polysaccharide comprising galactose and/or mannose units. It is preferred that the paper product has a tensile index of at least 10 Nm/g, preferably at least 15 Nm/g, more preferably at least 20 Nm/g and most preferably at least 22 Nm/g at a filler loading of 20 wt.-%.

A still further aspect of the present invention is directed to the use of the self-binding pigment particle suspension as filler material. It is preferred that the filler material is used in paper, plastics, paint, concrete and/or agriculture applications. It is further preferred that the self-binding pigment particle suspension is used in wet end process of a paper machine, in cigarette paper and/or coating applications, or as a support for rotogravure and/or offset and/or digital printing. It is also preferred that the self-binding pigment particle suspension is used to reduce sun light and UV exposure of plant leaves.

When in the following reference is made to preferred embodiments or technical details of the inventive process for preparing self-binding pigment particle suspensions, it is to be understood that these preferred embodiments and technical details also refer to the inventive self-binding pigment particle suspension, the inventive paper product comprising a pigment material as well as to the use of the self-binding pigment particle suspension defined herein and vice versa (as far as applicable). If, for example, it is set out that the aqueous pigment material suspension provided in the process for preparing self-binding pigment particle suspensions comprises a pigment material selected from the group comprising calcium carbonate, calcium carbonate containing minerals, mixed carbonate based fillers, or mixtures thereof, also the inventive self-binding pigment particle suspension, the inventive paper product comprising a pigment material as well as the use of the self-binding pigment particle suspension preferably comprise a pigment material selected from the group comprising calcium carbonate, calcium carbonate containing minerals, mixed carbonate based fillers, or mixtures thereof.

According to one preferred embodiment of the inventive process for preparing self-binding pigment particle suspensions, the pigment material suspension of step a) comprises a pigment material selected from the group comprising calcium carbonate, calcium carbonate containing minerals, mixed carbonate based fillers, or mixtures thereof, and wherein the calcium carbonate containing minerals preferably comprise dolomite, and the mixed carbonate based fillers are preferably selected from calcium associated with magnesium, clay, talc, talc-calcium carbonate mixtures, calcium carbonate-kaolin mixtures, or mixtures of natural calcium carbonate with aluminium hydroxide, mica or with synthetic or natural fibers or co-structures of minerals, preferably talc-calcium carbonate or talc-titanium dioxide or calcium carbonate-titanium dioxide co-structures.

According to another preferred embodiment of the inventive process for preparing self-binding pigment particle suspensions, the calcium carbonate is a ground natural calcium carbonate, a precipitated calcium carbonate, a modified calcium carbonate, or a mixture thereof.

According to yet another preferred embodiment of the inventive process for preparing self-binding pigment particle suspensions, the binder of step b) comprises at least one polysaccharide comprising galactose and mannose units.

According to one preferred embodiment of the inventive process for preparing self-binding pigment particle suspensions, the binder of step b) comprises a cationic derivative of the at least one polysaccharide.

According to another preferred embodiment of the inventive process for preparing self-binding pigment particle suspensions, the binder of step b) comprises at least one polysaccharide comprising a linear chain of 1,4-linked β-D-mannopyranosyl units, preferably the linear chain of 1,4-linked β-D-mannopyranosyl units is 1,6-linked with α-D-galactopyranosyl units.

According to yet another preferred embodiment of the inventive process for preparing self-binding pigment particle suspensions, the binder of step b) comprises at least one polysaccharide having a ratio of mannose units to galactose units from 6:1 to 1:1, preferably from 5:1 to 1:1, more preferably from 4:1 to 1:1 and most preferably from 3:1 to 1:1.

According to one preferred embodiment of the inventive process for preparing self-binding pigment particle suspensions, the binder of step b) is in form of a hydrocolloidal solution or a dry material, preferably in form of a hydrocolloidal solution.

According to another preferred embodiment of the inventive process for preparing self-binding pigment particle suspensions, the binder of step b) is in form of a hydrocolloidal solution having a binder concentration from 0.05 wt.-% to 10 wt.-%, preferably from 0.1 wt.-% to 5 wt.-%, more preferably from 0.1 wt.-% to 2 wt.-% and most preferably from 0.1 wt.-% to 1 wt.-%, based on the total weight of the solution.

According to yet another preferred embodiment of the inventive process for preparing self-binding pigment particle suspensions, the binder in step c) is added to the aqueous pigment material suspension in an amount from 0.1 wt.-% and 10 wt.-%, preferably from 0.05 wt.-% to 5.0 wt.-%, more preferably from 0.1 wt.-% to 2 wt.-% and most preferably from 0.25 wt.-% to 1 wt.-%, based on the total weight of the pigment material suspension.

According to one preferred embodiment of the inventive process for preparing self-binding pigment particle suspensions, the solids content in step c) is adjusted such that it is at least 1 wt.-%, preferably from 1 wt.-% to 80 wt.-%, more preferably from 5 wt.-% to 60 wt.-%, even more preferably from 10 wt.-% to 50 wt.-% and most preferably from 15 wt.-% to 45 wt.-%, based on the total weight of the pigment material suspension.

According to another preferred embodiment of the inventive process for preparing self-binding pigment particle suspensions, grinding step d) is carried out during and/or after step c), preferably after step c).

According to yet another preferred embodiment of the inventive process for preparing self-binding pigment particle suspensions, grinding step d) is carried out at a temperature from 10° C. to 110° C., preferably from 20° C. to 60° C. and most preferably from 20° C. to 45° C.

According to one preferred embodiment of the inventive process for preparing self-binding pigment particle suspensions, grinding step d) is carried out until the fraction of self-binding pigment particles having a particle size of less than 1 μm is greater than 5 wt.-%, preferably greater than 20 wt.-%, more preferably greater than 40 wt.-%, more preferably greater than 50 wt.-%, and most preferably greater than 60 wt.-%, based on the total weight of the pigment particles.

According to another preferred embodiment of the inventive process for preparing self-binding pigment particle suspensions, grinding step d) is carried out in batch or continuously, preferably continuously.

According to yet another preferred embodiment of the inventive process for preparing self-binding pigment particle suspensions, the process further comprises step e) of concentrating the obtained pigment material suspension such that the solids content in the suspension is at least 45 wt.-%, preferably from 45 wt.-% to 80 wt.-%, more preferably from 50 wt.-% to 80 wt.-%, even more preferably, from 60 wt.-% to 79 wt.-% and most preferably from 65 wt.-% to 78 wt.-%, based on the total weight of the pigment material suspension.

According to one preferred embodiment of the inventive process for preparing self-binding pigment particle suspensions, concentration step e) is carried out before or after step d)

According to another preferred embodiment of the inventive process for preparing self-binding pigment particle suspensions, before or during or after step c) and/or step d) a dispersing agent is added.

As set out above, the inventive process for preparing self-binding pigment particle suspensions comprises the steps a), b), c) and d). In the following, it is referred to further details of the present invention and especially the foregoing steps of the inventive process for preparing self-binding pigment particle suspensions.

Step a): Provision of an Aqueous Pigment Material Suspension

According to step a) of the process of the present invention, an aqueous pigment material suspension is provided.

The aqueous pigment material suspension is obtained by mixing a particulate pigment material with water. The pigment material to be processed according to the inventive process may be selected from calcium carbonate, calcium carbonate containing minerals, mixed carbonate based fillers, or mixtures thereof.

According to a preferred embodiment of the present invention, the pigment material is a calcium carbonate. Calcium carbonate may be a ground natural calcium carbonate, also named heavy calcium carbonate, a precipitated calcium carbonate, also named light calcium carbonate, a modified calcium carbonate or a mixture thereof.

"Ground natural calcium carbonate" (GNCC) in the meaning of the present invention is a calcium carbonate obtained from natural sources, such as limestone, marble, chalk and mixtures thereof, and processed through a wet and/or dry treatment such as grinding, screening and/or fractionating, for example by a cyclone or classifier.

"Modified calcium carbonate" (MCC) in the meaning of the present invention may feature a natural ground or precipitated calcium carbonate with an internal structure modification or a surface-reaction product. According to a preferred embodiment of the present invention, the modified calcium carbonate is a surface-reacted calcium carbonate.

"Precipitated calcium carbonate" (PCC) in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as diverse assortment of thin elongated prismatic, curved bladed, steep pyramidal, chisel shaped crystals, branching tree, and coral or worm-like form.

In one preferred embodiment of the inventive process, the pigment material comprises a mixture of ground natural calcium carbonate, a precipitated calcium carbonate or a modified calcium carbonate. For example, if the pigment material comprises a mixture of ground natural calcium carbonate, the pigment material comprises a mixture of at least two pigment materials selected from limestone, marble and chalk.

According to one embodiment of the present invention, the calcium carbonate-containing mineral comprises dolomite.

According to a preferred embodiment, the mixed carbonate based fillers are selected from calcium associated with magnesium and analogues or derivatives, various matter such as clay or talc or analogues or derivatives, and mixtures of these fillers, such as, for example, talc-calcium carbonate or calcium carbonate-kaolin mixtures, or mixtures of natural calcium carbonate with aluminium hydroxide, mica or with synthetic or natural fibers or co-structures of minerals such as talc-calcium carbonate or talc-titanium dioxide or calcium carbonate-titanium dioxide co-structures.

The particulate pigment material of the aqueous pigment material suspension provided in step a) may have a particle size distribution as conventionally employed for the material(s) involved in the type of product to be produced. In general, it is preferred that the pigment material particles in the suspension have a weight median particle diameter $d_{50}$ value of from 0.05 µm to 100 µm, preferably from 0.1 µm to 60 µm and more preferably from 0.4 µm to 20 µm, most preferably from 0.6 µm to 10 µm, for example from 0.7 µm to 1.0 as measured using a Sedigraph™ 5120 of Micromeritics Instrument Corporation.

The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size at which 50 wt.-% of all grains are bigger or smaller than this particle size. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

In a preferred embodiment, the pigment material particles in the suspension exhibit a BET specific surface area of from 0.1 $m^2/g$ to 200 $m^2/g$, more preferably 3 $m^2/g$ to 25 $m^2/g$, most preferably 5 $m^2/g$ to 15 $m^2/g$ and even more preferably 6 $m^2/g$ to 12 $m^2/g$, measured using nitrogen and the BET method according to ISO 9277.

The pigment material particles of the present invention are suspended in water and thus form an aqueous suspension or slurry of pigment material.

Preferably, the aqueous pigment material suspension provided in step a) has a solids content from 1 wt.-% to 80 wt.-%, preferably from 5 wt.-% to 60 wt.-%, more preferably from 10 wt.-% to 50 wt.-% and most preferably from 15 wt.-% to 45 wt.-%, based on the total weight of the pigment material suspension.

Step b): Provision of at Least One Polymeric Binder

According to step b) of the process of the present invention, at least one polymeric binder is provided. Said polymeric binder comprises at least one polysaccharide comprising galactose and/or mannose units.

In case all the monosaccharide units in the at least one polysaccharide are of the same type, the polysaccharide is also named a homopolysaccharide or homoglycan. If the at least one polysaccharide is composed of more than one type of monosaccharide units, the polysaccharide is also named a heteropolysaccharide or heteroglycan.

In one preferred embodiment of the present invention, the at least one polysaccharide is a homopolysaccharide. Preferably, the homopolysaccharide is composed of a plurality of repeating units of galactose. More preferably, the repeating units of galactose are α-D-galactopyranosyl units and/or β-D-galactopyranosyl units. In one preferred embodiment, the homopolysaccharide is composed of repeating units of β-D-galactopyranose or α-D-galactopyranose. In an especially preferred embodiment, the homopolysaccharide is a linear chain of 1,4-linked β-D-galactopyranosyl units.

Additionally or alternatively, the homopolysaccharide is composed of a plurality of repeating units of mannose. More preferably, the repeating units of mannose are α-D-mannopyranosyl units and/or β-D-mannopyranosyl units. In one preferred embodiment, the homopolysaccharide is composed of repeating units of β-D-mannopyranose or α-D-mannopyranose. In an especially preferred embodiment, the homopolysaccharide is a linear chain of 1,4-linked β-D-mannopyranosyl units.

In another preferred embodiment of the present invention, the at least one polysaccharide is a heteropolysaccharide comprising mannose units and galactose units. Preferably, the heteropolysaccharide comprises galactose units selected from α-D-galactopyranose, β-D-galactopyranose and mixtures thereof and mannose units selected from α-D-mannopyranose, β-D-mannopyranose and mixtures thereof.

For example, the heteropolysaccharide comprises β-D-mannopyranosyl units and α-D-galactopyranosyl units. In one preferred embodiment, the heteropolysaccharide comprises a linear chain of 1,4-linked β-D-mannopyranosyl units to which α-D-galactopyranosyl units are 1,6-linked. Preferably, the heteropolysaccharide comprises a linear chain of 1,4-linked β-D-mannopyranosyl units to which single α-D-galactopyranosyl units are 1,6-linked.

If the at least one polysaccharide comprises a heteropolysaccharide comprising mannose units and galactose units, the at least one polysaccharide has a ratio of mannose units to galactose units from 6:1 to 1:1, preferably from 5:1 to 1:1, more preferably from 4:1 to 1:1 and most preferably from 3:1 to 1:1, e.g. in a ratio of mannose units to galactose units of 2:1.

For example, the at least one polysaccharide comprises a linear chain of 1,4-linked β-D-mannopyranosyl units with 1,6-linked α-D-galactopyranosyl units on average to every second mannose unit.

Additionally or alternatively, a derivative of the at least one polysaccharide may be utilized in the process of the present invention. Such derivative may be obtained, for example, by modifying the polysaccharide through the use of enzymes, acids, oxidation media, temperature, radiation etc. Methods for preparing such derivatives are known to the skilled person. For example, a modification may be obtained by etherification of the polysaccharide with propyleneoxide or ethyleneoxide resulting in a hydroxypropyl derivative or hydroxyethyl derivative.

In one preferred embodiment of the present invention, the binder comprises an anionic derivative of the at least one polysaccharide. For example, the anionic derivative of the at least one polysaccharide is a carboxymethyl derivative and/or carboxymethyl hydroxypropyl derivative and/or carboxymethyl hydroxyethyl derivative of the at least one polysaccharide.

In another preferred embodiment of the present invention, the binder comprises a cationic derivative of the at least one polysaccharide. For example, the cationic derivative of the at least one polysaccharide is obtained by reacting the polysaccharide with derivatives of quaternary ammonium salts.

Methods for preparing such anionic and/or cationic derivatives of the at least one polysaccharide are known to the skilled person.

The cationic derivative and/or anionic derivative of the at least one polysaccharide preferably has a degree of substitution of the hydroxyl groups of at least 0.01, more preferably of at least 0.05 and may be as high as 1.0. A suitable degree of substitution of the hydroxyl groups may be from 0.1 to 0.5.

The molecular weight of the at least one polysaccharide preferably ranges from 1 000 to 1 000 000 Da and is generally about 220 000 Da. The molecular weight of the at least one polysaccharide can be adjusted by the treatment with hydrogen peroxide ($H_2O_2$).

In one preferred embodiment of the present invention, the at least one polysaccharide is guar and/or a guar derivative. Guar comprises a natural heteropolysaccharide (guaran) consisting of galactose units and mannose units usually in the ratio of 1:2 and is the endosperm component of guar seeds. In general, guar comprises a linear chain of 1,4-linked β-D-mannopyranosyl units with 1,6-linked α-D-galactopyranosyl units. Guar seeds containing about 14 to 17 wt.-% husk, 35 to 42 wt.-% endosperm and 43 to 47 wt.-% embryo, are usually dry-milled and screened to separate out the endosperm which is the industrial guar of commerce.

In one preferred embodiment, guar is used in its natural form in the process of the present invention, i.e. the heteropolysaccharide is untreated.

Additionally or alternatively, a guar derivative may be utilized in the process of the present invention. A guar derivative is obtained, for example, by modifying the heteropolysaccharide through the use of enzymes, acids, oxidation media, temperature, radiation etc. Methods for preparing such guar derivatives are known to the skilled person. For example, a modification may be obtained by the use of a commercially available α-D-galactosidase enzyme which is useful to remove α-D-galactopyranosyl units. By controlling the length of time that the guaran is exposed to the α-D-galactosidase enzyme, the extent of removal of α-D-galactopyranosyl units from the linear chain of mannose units can be controlled. Additionally or alternatively, a modification of guar may be obtained by etherification of guar with propyleneoxide or ethyleneoxide resulting in a hydroxypropyl guar or hydroxyethyl guar.

In one preferred embodiment of the present invention, the guar derivative is an anionic guar derivative such as a carboxymethyl guar (CMG) and/or carboxymethyl hydroxypropyl guar (CMHPG) and/or carboxymethyl hydroxyethyl guar (CMHEG). For example, carboxymethyl guar is obtained by reacting a guar with monochloroacetic acid in the presence of caustic soda.

In another preferred embodiment of the present invention, the guar derivative is a cationic guar derivative obtained by reacting guar with derivatives of quaternary ammonium salts.

The cationic guar derivative and/or anionic guar derivative has a degree of substitution of the hydroxyl groups of at least 0.01, preferably of at least 0.05 and may be as high as 2. A suitable degree of substitution of the hydroxyl groups may be from 0.1 to 1.

The molecular weight of the guar ranges from 1 000 to 1 000 000 Da and is generally about 220 000 Da. The molecular weight of the guar can be adjusted by the treatment with hydrogen peroxide ($H_2O_2$).

Suitable cationic guar derivatives are available from a wide variety of commercial sources. Useful cationic guar derivatives include the guar derivatives available from Polygal AG, Märstetten, Switzerland as Polygal CA-310 D.

Suitable natural guars are available from a wide variety of commercial sources. Useful natural guars include the guar available from Sigma Aldrich, Buchs, Switzerland as G4129.

In one preferred embodiment of the present invention, the at least one polysaccharide is soluble in water.

The term "soluble" in the meaning of the present invention refers to systems in which no discrete solid particles are observed in the solvent, i.e. the at least one polysaccharide forms a hydrocolloidal solution, wherein the hydrocolloid particles of the at least one polysaccharide are dispersed in the solvent.

The binder can be provided in form of a hydrocolloidal solution or a dry material. In one preferred embodiment, the binder is provided in form of a hydrocolloidal solution.

If the binder is provided in form of a hydrocolloidal solution, the solution can be in form of an aqueous hydrocolloidal solution, i.e. the polymeric binder is provided in water. Alternatively, the hydrocolloidal solution can be in form of an organic suspension, i.e. the polymeric binder is provided in an organic solvent selected from the group comprising methanol, ethanol, acetone and mixtures thereof.

For example, the binder is provided in form of an aqueous hydrocolloidal solution.

In one preferred embodiment of the present invention, the binder is in form of a hydrocolloidal solution having a binder concentration from 0.05 wt.-% to 10 wt.-%, preferably from 0.1 wt.-% to 5 wt.-%, more preferably from 0.1 wt.-% to 2 wt.-% and most preferably from 0.1 wt.-% to 1 wt.-%, based on the total weight of the solution.

Step c): Mixing the Binder with the Aqueous Pigment Material Suspension

According to step c) of the process of the present invention, the polymeric binder of step b) is mixed with the aqueous pigment material suspension of step a).

In one preferred embodiment of the present invention, the binder is added to the aqueous pigment material suspension in an amount from 0.1 wt.-% and 10 wt.-%, preferably from 0.05 wt.-% to 5.0 wt.-%, more preferably from 0.1 wt.-% to 2 wt.-% and most preferably from 0.25 wt.-% to 1 wt.-%, based on the total weight of the pigment material suspension.

The amount of binder in the suspension can be adjusted by methods known to the skilled person. To adjust the amount of binder in the suspension, the suspension may be partially or fully dewatered by a filtration, centrifugation or thermal separation process. For example, the suspension may be partially or fully dewatered by a filtration process such as nanofiltration or a thermal separation process such as an evaporation process. Alternatively, water may be added to the suspension until the desired amount of binder is obtained.

Additionally or alternatively, the solids content in step c) is adjusted such that it is at least 1 wt.-%, preferably from 1 wt.-% to 80 wt.-%, more preferably from 5 wt.-% to 60 wt.-%, even more preferably from 10 wt.-% to 50 wt.-% and most preferably from 15 wt.-% to 45 wt.-%, based on the total weight of the pigment material suspension.

The solids content of the suspension can be adjusted by methods known to the skilled person. To adjust the solids content of an aqueous pigment material comprising suspension, the suspension may be partially or fully dewatered by a filtration, centrifugation or thermal separation process. For example, the suspension may be partially or fully dewatered by a filtration process such as nanofiltration or a thermal separation process such as an evaporation process. Alternatively, water may be added to the particulate material of the aqueous pigment material suspension (e.g. resulting from filtration) until the desired solids content is obtained. Additionally or alternatively, a self-binding pigment particle suspension having an appropriate lower content of solid particles may be added to the particulate material of the aqueous pigment material suspension until the desired solids content is obtained.

In the process of the present invention, the binder can be mixed with the aqueous pigment material suspension by any conventional mixing means known to the skilled person.

In one preferred embodiment of the present invention, the aqueous pigment material suspension obtained in step c) has a pH from 6 to 12, preferably from 6.5 to 10 and more preferably from 7 to 9.

The aqueous pigment material suspension can be mixed with the binder in any appropriate form, e.g. in the form of a hydrocolloidal solution or a dry material.

Preferably, the binder is in form of a hydrocolloidal solution. In one preferred embodiment, the binder is in form of an aqueous hydrocolloidal solution having a binder concentration from 0.05 wt.-% to 10 wt.-%, preferably from 0.1 wt.-% to 5 wt.-%, more preferably from 0.1 wt.-% to 2 wt.-% and most preferably from 0.1 wt.-% to 1 wt.-%, based on the total weight of the solution.

Step d): Grinding the Aqueous Pigment Material Suspension

According to step d) of the process of the present invention, the aqueous pigment material suspension of step c) is ground.

The grinding process may be undertaken by all the techniques and grinders well known to the man skilled in the art for wet grinding. The grinding step may be carried out with any conventional grinding device, for example, under conditions such that refinement predominantly results from impacts with a secondary body, i.e. in one or more of: a ball mill, a rod mill, a vibrating mill, a centrifugal impact mill, a vertical bead mill, an attrition mill, or other such equipment known to the skilled person. The grinding step d) may be carried out in batch or continuously, preferably continuously.

In one preferred embodiment of the present invention, the aqueous suspension to be ground has a pH from 6 to 12, preferably from 6.5 to 10 and more preferably from 7 to 9.

Additionally or alternatively, the aqueous suspension obtained after grinding has a pH from 6 to 12, preferably from 6.5 to 10 and more preferably from 7 to 9.

In one preferred embodiment of the present invention, the grinding step d) is carried out at a temperature from 10° C. to 110° C., preferably from 20° C. to 60° C. and most preferably from 20° C. to 45° C.

In one preferred embodiment of the present invention, grinding step d) is carried out during and/or after step c).

For example, grinding step d) is carried out after step c).

In one preferred embodiment of the present invention, grinding step d) is carried out until the fraction of self-binding pigment particles having a particle size of less than 1 µm is greater than 5 wt.-%, preferably greater than 20 wt.-%, more preferably greater than 40 wt.-%, more preferably greater than 50 wt.-%, and most preferably greater than 60 wt.-%, based on the total weight of the pigment particles, as measured with a Sedigraph 5120.

Additionally or alternatively, the self-binding pigment particles obtained in step d) of the process of the present invention may have a weight median particle diameter $d_{50}$, measured according to the sedimentation method, in the range of from 0.05 µm to 3 µm, preferably from 0.1 µm to 2 µm and most preferably from 0.4 µm to 1 µm, for example from 0.6 µm to 0.8 µm. Additionally or alternatively, the self-binding pigment particles obtained in step d) may have a $d_{98}$ of less than 10 µm preferably of less than 5, more preferably of less than 3 and most preferably of less than 2 µm.

In one preferred embodiment of the present invention, the self-binding pigment particles obtained in step d) exhibit a BET specific surface area of from 1 m$^2$/g to 201 m$^2$/g, more preferably 3 m$^2$/g to 25 m$^2$/g, most preferably 5 m$^2$/g to 15 m$^2$/g and even more preferably 6 m$^2$/g to 12 m$^2$/g, measured using nitrogen and the BET method according to ISO 9277.

In one preferred embodiment of the present invention, the solids content of the obtained suspension in step d) is at least 1 wt.-%, preferably from 1 wt.-% to 80 wt.-%, more preferably from 5 wt.-% to 60 wt.-%, even more preferably from 10 wt.-% to 50 wt.-% and most preferably from 15 wt.-% to 45 wt.-%, based on the total weight of the pigment material suspension.

In one preferred embodiment of the present invention, the process of the invention may lead directly to a high solids suspension of self-binding pigment particles, i.e. the process of the present invention does not require an additional concentration step.

If a high solids suspension of self-binding pigment particles is obtained, the solids content of the obtained suspension is at least 45 wt.-% and preferably from 45 wt.-% to 80 wt.-%, based on the total weight of the pigment material suspension. For example, the solids content of the obtained suspension is from 50 wt.-% to 80 wt.-%, preferably from 60 wt.-% to 79 wt.-% and more preferably from 65 wt.-% to 78 wt.-%, based on the total weight of the pigment material suspension.

In one preferred embodiment of the present invention, the process further comprises step e) of concentrating the obtained pigment material suspension.

In one preferred embodiment of the present invention, concentration step e) is carried out before or after step d).

For example, concentration step e) is carried out before step d). Alternatively, concentration step e) is carried out after step d).

If step e) is implemented in the process of the present invention, the solids content in the obtained suspension is adjusted such that it is at least 45 wt.-%, preferably from 45 wt.-% to 80 wt.-%, more preferably from 50 wt.-% to 80 wt.-%, even more preferably, from 60 wt.-% to 79 wt.-% and most preferably from 65 wt.-% to 78 wt.-%, based on the total weight of the pigment material suspension.

The solids content of the obtained suspension can be adjusted by concentrating methods known to the skilled person. The concentrating of the corresponding pigment material suspension may be achieved by means of a thermal process, for example in an evaporator, or by means of a mechanical process, for example in a filter press such as nanofiltration, and/or centrifuge.

In one preferred embodiment of the present invention, the process comprises step e) of concentrating the obtained pigment material suspension such that the solids content in the obtained suspension is at least 65 wt.-%, more preferably at least 80 wt.-% and most preferably at least 90 wt.-%, based on the total weight of the pigment material suspension.

In one preferred embodiment of the present invention, the process comprises step e) of concentrating the obtained pigment material suspension such that a dry product is obtained.

The term "dry product" is understood to refer to pigment particles having a total surface moisture content of less than 0.5 wt.-%, preferably less than 0.2 wt.-% and more preferably less than 0.1 wt.-%, based on the total weight of the pigment particles.

If the inventive process further comprises step e) of concentrating the obtained pigment material suspension such that a dry product or a suspension having a solids content of at least 65 wt.-%, more preferably at least 80 wt.-% and most preferably at least 90 wt.-%, based on the total weight of the pigment material suspension, is obtained, the dry product or the suspension may be rediluted. If the dry product or the suspension is rediluted, the solids content in the obtained suspension is adjusted such that it is at least 1 wt.-%, preferably from 1 wt.-% to 80 wt.-%, more preferably from 5 wt.-% to 60 wt.-%, even more preferably from 10 wt.-% to 50 wt.-% and most preferably from 15 wt.-% to 45 wt.-%, based on the total weight of the pigment material suspension.

In one preferred embodiment of the present invention, a dispersing agent is added before or during or after process step c) and/or step d).

In one preferred embodiment of the present invention, the inventive process does not involve the use or addition of a dispersing agent during grinding.

In view of the very good results of the process for preparing self-binding pigment particle suspensions as defined above, a further aspect of the present invention refers to a self-binding pigment particle suspension which is obtainable by the process according to the present invention.

Such suspension contains a high solids content of self-binding mineral pigment particles, and preferably is free of stabilizing and/or dispersing agents. The inventive self-binding pigment particle suspension preferably has a low total organic content and/or a low content of free binder in the water phase of the suspension. The total organic content and/or content of free binder in the water phase can be determined after drying at 120° C. by measuring the loss on ignition (LOI) values at 570° C.

According to another aspect of the present invention, a paper product comprising self-binding pigment particles is provided, characterized in that the pigment particles are at least partially coated with at least one polysaccharide comprising galactose and/or mannose units.

It is preferred that the paper product comprising self-binding pigment particles, has a tensile index of at least 10 Nm/g, preferably at least 15 Nm/g, more preferably at least 20 Nm/g and most preferably at least 22 Nm/g at a filler loading of 20 wt.-%.

The improved tensile index of the products obtained from the self-binding pigment particle suspension of the present invention indicates a very good adhesion of the binder to the surface of the pigment particles and allows, thus, for the use of the inventive self-binding pigment particles in several applications, e.g., paper, paint and plastic applications. Another application is the coating of tree leaves and/or plant leaves to reduce sun light and UV exposure of the leave surface. Also the good cohesion properties (binding effect between particles) provide beneficial properties in such applications.

According to a further aspect of the present invention, the self-binding pigment particle suspension obtainable by the inventive process is used as filler material, e.g. in paper, plastics, paint, concrete and/or agriculture applications. According to an exemplary embodiment of the present invention, the self-binding pigment particle suspension obtainable by the inventive process is used in paper, e.g., in wet end process of a paper machine, preferably in cigarette paper and/or coating applications, or preferably as support for rotogravure and/or offset and/or digital printing.

It is to be understood that the advantageous embodiments described above with respect to the inventive method for making self-binding pigment particles also can be used for preparing or defining the inventive suspension, paper product and its use. In other words, the preferred embodiments described above and any combinations of these embodiments can also be applied to the inventive suspension, paper product and its use.

The scope and interest of the invention will be better understood based on the following examples which are intended to illustrate certain embodiments of the invention and are non-limitative.

EXAMPLES

Methods and Materials

In the following, materials and measurement methods implemented in the examples are described.

BET Specific Surface Area of a Material

The BET specific surface area was measured via the BET method according to ISO 9277 using nitrogen, following conditioning of the sample by heating at 250° C. for a period of 30 minutes. Prior to such measurements, the sample was filtered, rinsed and dried at 110° C. in an oven for at least 12 hours.

Particle Size Distribution (Mass % Particles with a Diameter <X) and Weight Median Diameter ($d_{50}$) of a Particulate Material Weight median grain diameter and grain diameter mass distribution of a particulate material were determined via the sedimentation method, i.e. an analysis of sedimentation behavior in a gravitational field. The measurement was made with a Sedigraph™ 5120.

The method and the instrument are known to the skilled person and are commonly used to determine grain sizes of fillers and pigments. The measurement was carried out in an aqueous solution of 0.1 wt.-% $Na_4P_2O_7$. The samples were dispersed using a high speed stirrer and ultrasonic.

pH of an Aqueous Suspension

The pH of the aqueous suspension was measured using a standard pH-meter at approximately 22° C.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

Handsheet Study

The handsheet study and the consequent testing of the mechanical strength properties of the paper is a measure for the binding ability of the self-binding pigment to other surfaces like cellulosic fibres.

Eucalyptus pulp (Jarilyptus) refined to 30° SR was used for this study. 60 g (dry) pulp blend were diluted in 10 dm³ tap water, and then the filler was added. The suspension was stirred for 30 minutes. Subsequently 0.06% (based on dry weight) of a polyacrylamide (Polymin 1530, commercially available from BASF, Ludwigshafen, Germany) was added as a retention aid and sheets of 78 g/m² were formed using the Rapid-Köthen hand sheet former. Each sheet was dried using the Rapid-Köthen drier. The filler content in the handsheets was determined by burning a quarter of a dry handsheet in a muffle furnace heated to 570° C. After the burning was completed, the residue was transferred in a desiccator and allowed to cool down. When room temperature was reached, the weight of the residue was measured and the mass was related to the initially measured weight of the dry quarter hand sheet. The filler content in the examples was 20-30%.

The mechanical strength properties of the handsheets were characterized by the tensile index and internal bond according to ISO 1924-2 and SCAN-P80:98/TAPPI T541, respectively, after drying of the handsheets.

Tablet Crushing Test

This test is a measure for the self-binding power of a pigment. It is a measure for the force needed to crush tablets that were formed from the self-binding pigment slurries.

To demonstrate the suitability for the self-binding character of the pigmentary particles thus obtained, tablets were formulated using a membrane filtration process. In this regard, an apparatus of the high-pressure filter press type was used, manufactured from a hollow steel tube. The said tube is closed at the top by a lid and contains the filtration membrane at the bottom.

Tablets were formed by applying a constant pressure (15 bar) to 80 ml of the aqueous pigment material suspension measured for 2 to 48 hours such that water is released by filtration through a fine 0.025 μm filter membrane resulting in a compacted tablet. This method produces tablets of about 4 cm diameter with a thickness of 1.5 to 2.0 cm. The obtained tablets were dried in an oven at 60° C. for 48 hours.

The device and method used are described in detail in the document entitled "Modified calcium carbonate coatings with rapid absorption and extensive liquid uptake capacity" (Colloids and Surfaces A, 236 (1-3), 2003, pp. 91-102).

Subsequently, the tablets were ground into disc-shaped samples of 2.0-2.1 cm diameter with a thickness of 0.6-0.7 cm for the strength test analysis by using a disk mill (Jean Wirtz, Phoenix 4000). This procedure is described in the document entitled "Fluid transport into porous coating structures: some novel findings" (Tappi Journal, 83 (5), 2000, pp. 77-78). These smaller tablet discs were crushed under pressure to test their strength property by using the penetration apparatus Zwick/Roell Alround Z020 from the company Zwick GmbH & Co. KG, Ulm, Germany. The piston is brought down into contact with the sample at a deformation speed of 3 mm per minute, the test stops at 95% deformation or 20 kN. At the first local maximum in the measurement a crack in the sample occurred. The values given herein are the average of three measurements of independently prepared tablets and the error bars are the standard deviation of these three measurements.

Polyelectrolyte Titration (PET)

The polyelectrolyte content in the aqueous suspension is determined using a Memotitrator Mettler DL 55 equipped with a Phototrode DP 660 commercialised by Mettler-Toledo, Switzerland. The measurements of the poylelectrolyte content was carried out by weighing a sample of the calcium carbonate suspension into a titration vessel and diluting said sample with deionized water up to a volume of approximately 40 ml. Subsequently, 10 ml of 0.01 M cationic poly(N,N-dimethyl-3,5-dimethylene-piperidinium chloride) (PDDPC; obtained from ACROS Organics, Belgium) are slowly added under stirring into the titration vessel within 5 min. and than the content of the vessel is stirred for another 20 min. Afterwards the suspension is filtered trough a 0.2 μm mix-ester membrane filter (Ø 47 mm) and washed with 5 ml of deionized water. The thus obtained filtrate is diluted with 5 ml of phosphate buffer pH 7 (Riedel-de Haën, Germany) and than 0.01 M of a potassium polyvinylsulfate (KPVS; obtained from SERVA Feinbiochemica, Heidelberg) solution is added slowly to the filtrate to titrate the excess of cationic reagent. The endpoint of titration is detected by a Phototrode DP660, which is adjusted to 1200 to 1400 mV in deionized water, prior to such measurement. The charge calculation is carried out according to the following evaluation:

$$Q_{atro} = \frac{((V_{PDDPC} * I_{PDA}) - V_{KPVS}) * (-1000)}{E_P * Fk} \ [\mu Val/g]$$

$$w_{atro} = -\frac{Q_{atro}}{K_{DM} * 100} \ [\%]$$

Calculation of the optimal sample weight:

$$E_P = \frac{60}{w_{DM} * K_{DM} * Fk}$$

Calculation of adapted sample weight for 4 ml consumption:

$$E_{4\ ml} = \frac{E_1 * 6}{(10 - V_{KPVS,1})}$$

Abbreviations $E_P$=sample weight [g]
$w_{DM}$=Dispersing agent content in [%]
$K_{DM}$=Dispersing agent constant [μVal/0.1 mg dispersing agent]
Fk=Solids content [%]
$V_{PDDPC}$=Volume PDDPC [ml]

$V_{KPVS}$=Volume KPVS [ml]
$t_{PDDPC}$=Titer PDDPC
$E_{DM}$=Dispersing agent weight [mg]
Q=Charge [µVal/g]
$w_{atro}$=Dispersing agent content atro [%]
$E_1$=Sample weight of experiment to be optimised [g]
$V_{KPVS,1}$=experimental consumption KPVS [ml] of experiment to be optimised Loss on Ignition (LOI) Method For the measurement of the loss on ignition, samples of the self-binding pigment material suspensions were dried in a microwave at approximately 200 W for about 75 min such that the samples have maximum moisture of about 0.5 wt.-%, based on the total weight of the particulate material. Subsequently, the dried samples were de-agglomerated by using a RETSCH ultra-centrifugal mill (type ZM) with 200 µm screen and rotor having 24 teeth. 3 to 4 g of the obtained sample was weighed into a porcelain crucible and heated in a muffle oven at about 570° C. until constant mass. After cooling in a desiccator, the porcelain crucible was weighed with the obtained residue. The values given herein are the average of two measurements of independently prepared samples.

The loss on ignition is an absolute measurement displayed in percent and calculated according to the following formula:

$$\frac{100*(m_1 - m_2)}{m_1}$$

with $m_1$: mass of initial weight [g]
$m_2$: mass after heating to about 570° C. in a muffle oven [g]

Example 1 (Inventive Example)

The particulate material used for the preparation of the slurry was a marble of Norwegian origin.

The pigment slurry had a solids content of about 20 wt.-%, based on the total weight of the suspension. The particulate material has a weight median particle diameter $d_{50}$ value of 0.8 µm, a $d_{90}$ of less than 2 µm and a $d_{60}$ of less than 1 µm (all measured according to the sedimentation method). Furthermore, the particulate material of the slurry had a specific surface area of 7 m²/g (measured using nitrogen and the BET method).

A powder of guar in an amount of 0.4% by weight (commercialised by Sigma Aldrich under G4129), based on the total weight of the suspension, was blended before grinding into the suspension of the particulate material and stirred with a dissolver stirrer for 30 minutes.

The low solid suspension at ~20 wt.-% was run through a Dynomill Multilab filled with 460 cm³ Verac grinding beads (0.6-1.0 mm) for 90 minutes. The grinding chamber had a total volume of 600 cm³. The mill speed was set to 2 500 rpm and the flow was set to 500 cm³/min. Grinding was carried out at room temperature.

No significant increase in temperature was observed.

The product obtained was analysed by Sedigraph®, solids content, PET, pH and LOI. Table 1 summarizes the measured details of the final product.

TABLE 1

|  | Inventive Example 1 |
|---|---|
| <2 µm/% | 97.7 |
| <1 µm/% | 83.0 |
| $D_{50}$/µm | 0.56 |
| solids content/wt.-% | 20.2 |
| PET/µEq/g | −14.8 |
| pH | 6.28 |
| LOI/% | 2.6 |

In addition thereto, the effect of the self-binding pigment particle suspensions on the tensile index for handsheets prepared from the suspension obtained in Example 1 is outlined in FIG. 1.

Figure 2:
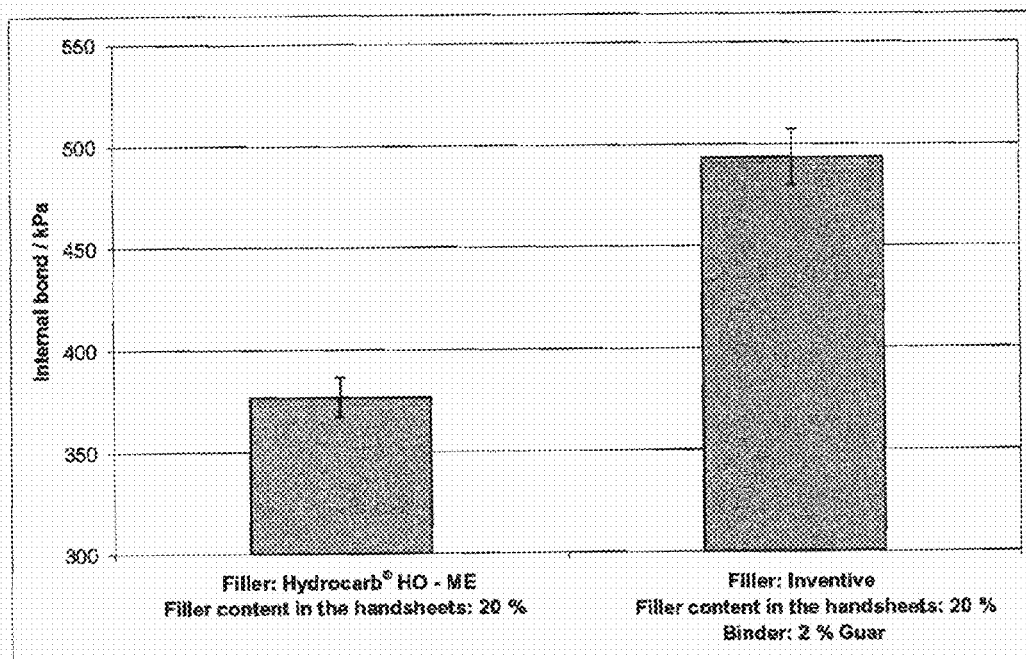
FIG. 2: illustrates the effect of the self-binding pigment particle suspensions on the internal bond (in z-Direction) for handsheets prepared from such suspensions.

Furthermore, the effect of the self-binding pigment particle suspensions on the internal bond (in z-Direction) for handsheets prepared from the suspension obtained in Example 1 is outlined in FIG. 2.

For comparative reasons, also the tensile index and the effect on the internal bond (in z-Direction) for handsheets prepared from a suspension comprising a commercially available product have been measured. The pigment particles used therefore are commercially available as Hydrocarb® HO-ME from Omya International AG, Oftringen, Switzerland. The product is in the form of a suspension of a natural CaCO₃ and has a solids content of 66 wt.-%, based on the total weight of the suspension. The particulate material in the suspension, measured on a Sedigraph 5120, has a weight median particle diameter $d_{50}$ value of 0.8 µm, a $d_{90}$ of less than 2 µm and a $d_{60}$ of less than 1 µm. Furthermore, the particulate material of the Hydrocarb® HO-ME has a specific surface area of 7 m²/g (measured using nitrogen and the BET method).

From FIGS. 1 and 2, it can be concluded that handsheets prepared from a suspension made in accordance with the inventive process achieve a tensile index of about 22 Nm/g and internal bond (in z-Direction) of at least 475 kPa. In contrast thereto, the measured tensile index of the handsheets prepared from the suspension comprising the commercially available pigment particles was 20 Nm/g, while the internal bond (in z-Direction) of below 400 kPa. Thus, it has to be assumed that the suspensions of self-binding pigments particles obtained by the inventive process impart positive effects on the mechanical strength properties of end products prepared from said suspensions.

Example 2 (Comparative Example)

The particulate material used for the preparation of the slurry was a marble of Norwegian origin.

The pigment slurry had a solids content of about 20 wt.-%, based on the total weight of the suspension. The particulate material has a weight median particle diameter $d_{50}$ value of 0.8 µm, a $d_{90}$ of less than 2 µm and a $d_{60}$ of less than 1 µm (all measured according to the sedimentation method). Furthermore, the particulate material of the slurry had a specific surface area of 7 m²/g (measured using nitrogen and the BET method).

The low solid suspension at ~20 wt.-% was run through a Dynomill Multilab filled with 460 cm³ Verac grinding beads (0.6-1.0 mm) for 90 minutes. The grinding chamber had a total volume of 600 cm³. The mill speed was set to 2 500 rpm and the flow was set to 500 cm³/min.

No significant increase in temperature was observed.

A powder of guar in an amount of 2% by weight (commercialised by Sigma Aldrich under G4129), based on the total weight of the suspension, was blended after grinding into the suspension and stirred for a short period of time. PET measurements of the guar showed an anionic charge of ≤−150 µEq/g.

The final product was analysed by Sedigraph®, solids content, PET, pH and LOI. Table 2 summarizes the measured details before the addition of guar and after the addition of guar.

TABLE 2

| | Comparative Example 2 | |
|---|---|---|
| | Before addition of guar | After addition of guar |
| <2 µm/% | 96.7 | 97.0 |
| <1 µm/% | 77.9 | 68.8 |
| $D_{50}$/µm | 0.61 | 0.77 |
| solids content/wt.-% | — | 19.4 |
| PET/µEq/g | — | −16.8 |
| pH | — | 6.41 |
| LOI/% | — | 2.7 |

From the measured details, it can be concluded that the addition of guar after grinding the aqueous pigment material suspension results in an increased weight median particle diameter $d_{50}$ value of the particulate material. Furthermore, it can be concluded that the amount of particulate material in the suspension having a weight median particle diameter value of less than 1 µm is decreased. Thus, it has to be assumed that the comparative example results in an undesired agglomeration of particulate material in the suspensions.

Example 3 (Inventive Example)

The particulate material used for the preparation of the slurry was a marble of Norwegian origin.

The pigment slurry had a solids content of about 20 wt.-%, based on the total weight of the suspension. The particulate material has a weight median particle diameter $d_{50}$ value of 0.8 µm, a $d_{90}$ of less than 2 µm and a $d_{60}$ of less than 1 µm (all measured according to the sedimentation method). Furthermore, the particulate material of the slurry had a specific surface area of 7 m²/g (measured using nitrogen and the BET method).

A powder of guar in an amount of 0.4% by weight (commercialised by Sigma Aldrich under G4129), based on the total weight of the suspension, was blended before grinding into the suspension of the particulate material and stirred with a dissolver stirrer for 60 minutes.

The low solid suspension at ~20 wt.-% was run through a Dynomill Multilab filled with 460 cm³ Verac grinding beads (0.6-1.0 mm) for 90 minutes. The grinding chamber had a total volume of 600 cm³. The mill speed was set to 2 500 rpm and the flow was set to 500 cm³/min. Grinding was carried out at room temperature.

No significant increase in temperature was observed.

Tablets were prepared and measured in the tablet crushing test with respect to the maximum force, $F_{max}$, required to make the first crack into a tablet. In particular, tablets were prepared from the suspension obtained in this Example and tablets prepared from suspensions comprising the commercially available products Covercarb® 75-ME having a weight median particle diameter $d_{50}$ value of 0.6 µm, Hydrocarb® 90-ME having a weight median particle diameter $d_{50}$ value of 0.7 µm or Omyacarb® 1-AV having a weight median particle diameter $d_{50}$ value of 1.7 µm (all available from Omya AG, Oftringen, Switzerland) but without using a binder.

The effect of the self-binding pigment particle suspensions on the maximum force, $F_{max}$, required to make the first crack into a tablet as measured in the tablet crushing test is outlined in FIG. 3.

From FIG. 3 it can be concluded that tablets prepared from a suspension made in accordance with the inventive process require a maximum force of about 1 400 N to make the first crack compared to a required maximum force of less than 350 N for tablets prepared without binder. Thus, it has to be assumed that the suspensions of self-binding pigments particles obtained by the inventive process impart positive effects on the mechanical strength properties of end products prepared from said suspensions.

The invention claimed is:

1. Paper, plastic, paint, concrete or an agriculture product comprising self-binding pigment particles prepared by the process comprising the following steps:
    a) providing an aqueous pigment material suspension, wherein the pigment of the pigment material suspension comprises calcium carbonate;
    b) providing a polymeric binder, wherein the binder consists of at least one polysaccharide comprising galactose and/or mannose units;
    c) mixing 0.1 wt.-% to 10 wt.-% of the binder of step b), based on the total weight of the aqueous pigment material suspension, with the aqueous pigment material suspension of step a), to obtain a mixture of the binder and the aqueous pigment material suspension; and
    d) grinding the mixture of the binder and the aqueous pigment material suspension obtained in step c) to obtain a suspension of self-binding pigment particles, wherein the weight median diameter ($d_{50}$) of the self-binding pigment particles is less than the weight median diameter ($d_{50}$) of the pigment from step a).

2. The paper, plastic, paint, concrete or an agriculture product according to claim 1, wherein the pigment material of the pigment material suspension of step a) comprises calcium carbonate and one or more of-dolomite, magnesium, clay, talc, kaolin, aluminium hydroxide, mica, titanium dioxide, synthetic fibers or natural fibers.

3. The paper, plastic, paint, concrete or an agriculture product according to claim 1, wherein the pigment material of the pigment material suspension of step a) is a ground natural calcium carbonate, a precipitated calcium carbonate, a modified calcium carbonate, or any mixture thereof.

4. The paper, plastic, paint, concrete or an agriculture product according to claim 1, wherein the pigment material of the pigment material suspension of step a) is a ground natural calcium carbonate.

5. The paper, plastic, paint, concrete or an agriculture product according to claim 1, wherein the binder of step b) is at least one polysaccharide comprising galactose and mannose units.

6. The paper, plastic, paint, concrete or an agriculture product according to claim 1, wherein the binder of step b) is at least one polysaccharide comprising a linear chain of 1,4-linked β-D-mannopyranosyl units or a linear chain of 1,4-linked β-D-mannopyranosyl units with 1,6-linked α-D-galactopyranosyl units.

7. The paper, plastic, paint, concrete or an agriculture product according to claim 1, wherein the binder of step b) is at least one polysaccharide having a ratio of mannose units to galactose units from 6:1 to 1:1.

8. The paper, plastic, paint, concrete or an agriculture product according to claim 1, wherein the binder of step b) is at least one polysaccharide having a ratio of mannose units to galactose units from 5:1 to 1:1.

9. The paper, plastic, paint, concrete or an agriculture product according to claim 1, wherein the binder of step b) is at least one polysaccharide having a ratio of mannose units to galactose units from 4:1 to 1:1.

10. The paper, plastic, paint, concrete or an agriculture product according to claim 1, wherein the binder of step b) is at least one polysaccharide having a ratio of mannose units to galactose units from 3:1 to 1:1.

11. The paper, plastic, paint, concrete or an agriculture product according to claim 1, wherein the binder of step b) is in a form of a hydrocolloidal solution or a dry material.

12. The paper, plastic, paint, concrete or an agriculture product according to claim 1, wherein the binder of step b) is in a form of a hydrocolloidal solution having a binder concentration from 0.05 wt.-% to 10 wt.-%, based on the total weight of the solution.

13. The paper, plastic, paint, concrete or an agriculture product according to claim 1, wherein the binder of step b) is in a form of a hydrocolloidal solution having a binder concentration from 0.1 wt.-% to 5 wt.-%, based on the total weight of the solution.

14. The paper, plastic, paint, concrete or an agriculture product according to claim 1, wherein in step c) 0.05 wt.-% to 5.0 wt.-% of the binder of step b), based on the total weight of the aqueous pigment material suspension, is mixed with the aqueous pigment material suspension of step a).

15. The paper, plastic, paint, concrete or an agriculture product according to claim 1, wherein in step c) 0.1 wt.-% to 2 wt.-% of the binder of step b), based on the total weight of the aqueous pigment material suspension, is mixed with the aqueous pigment material suspension of step a).

16. The paper, plastic, paint, concrete or an agriculture product according to claim 1, wherein in step c), the pigment material suspension has a solids content of 5 wt.-% to 80 wt.-%, based on the total weight of the pigment material suspension.

17. The paper, plastic, paint, concrete or an agriculture product according to claim 16, wherein in step c), the pigment material suspension has a solids content of 10 wt.-% to 60 wt.-%, based on the total weight of the pigment material suspension.

18. The paper, plastic, paint, concrete or an agriculture product according to claim 1, wherein grinding step d) is carried out at a temperature from 10° C. to 110° C.

19. The paper, plastic, paint, concrete or an agriculture product according to claim 1, wherein grinding step d) is carried out until the fraction of self-binding pigment particles having a particle size of less than 1 μm is greater than 20 wt.-%, based on the total weight of the pigment particles.

20. The paper, plastic, paint, concrete or an agriculture product according to claim 1, wherein grinding step d) is carried out until the fraction of self-binding pigment particles having a particle size of less than 1 μm is greater than 50 wt.-%, based on the total weight of the pigment particles.

21. The paper, plastic, paint, concrete or an agriculture product according to claim 1, wherein the suspension of self-binding pigment particles obtained in step d) is concentrated such that the solids content in the suspension is from 45 wt.-% to 80 wt.-%, based on the total weight of the pigment material suspension.

22. The paper, plastic, paint, concrete or an agriculture product according to claim 1, wherein before or during or after step c) and/or step d) a dispersing agent is added.

23. The paper, plastic, paint, concrete or an agriculture product according to claim 1, which is paper.

24. The paper, plastic, paint, concrete or an agriculture product according to claim 1, which is plastic.

25. The paper, plastic, paint, concrete or an agriculture product according to claim 1, which is paint.

26. The paper, plastic, paint, concrete or an agriculture product according to claim 1, which is concrete.

27. The paper, plastic, paint, concrete or an agriculture product according to claim 1, which is an agricultural product.

* * * * *